Patented Dec. 9, 1947

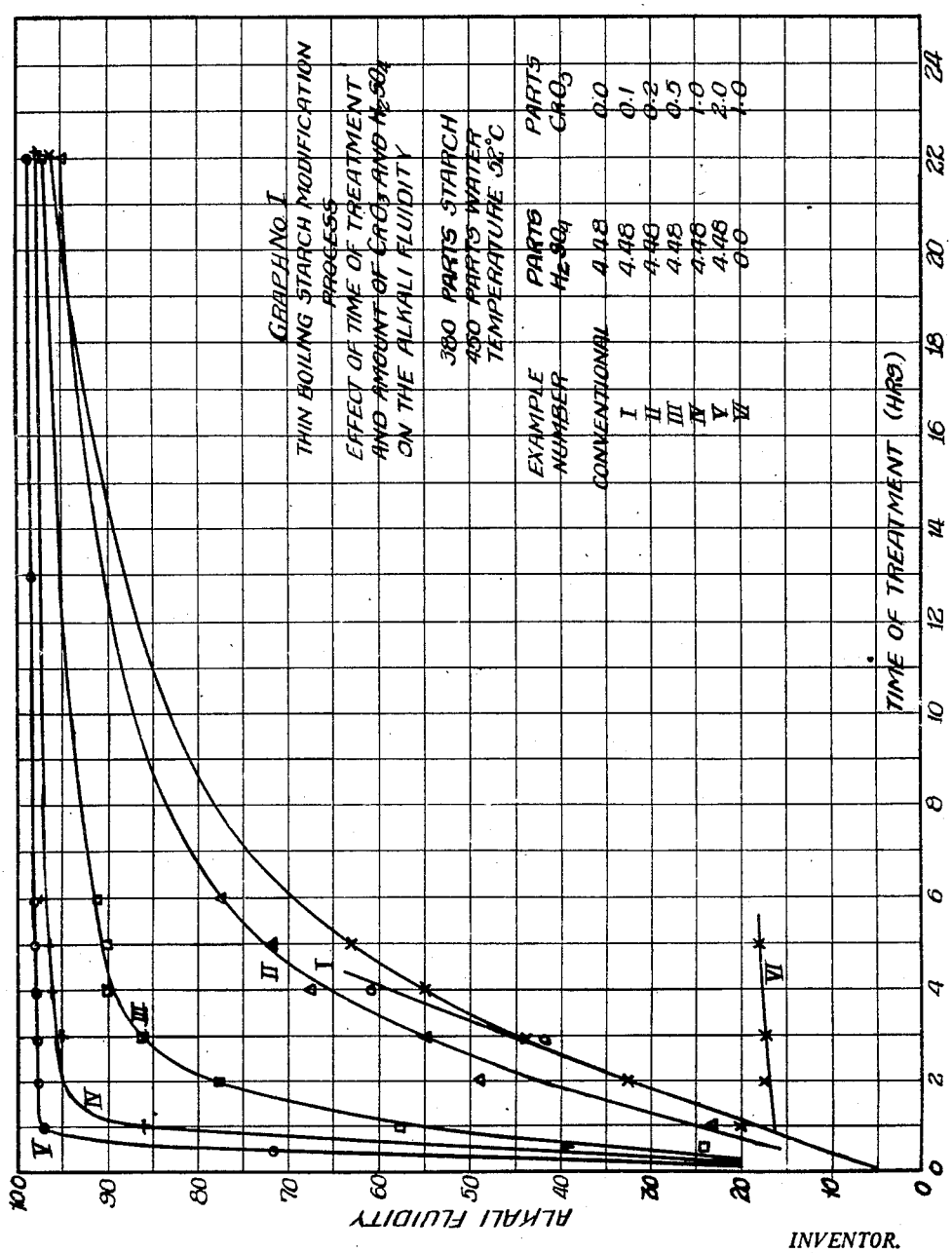

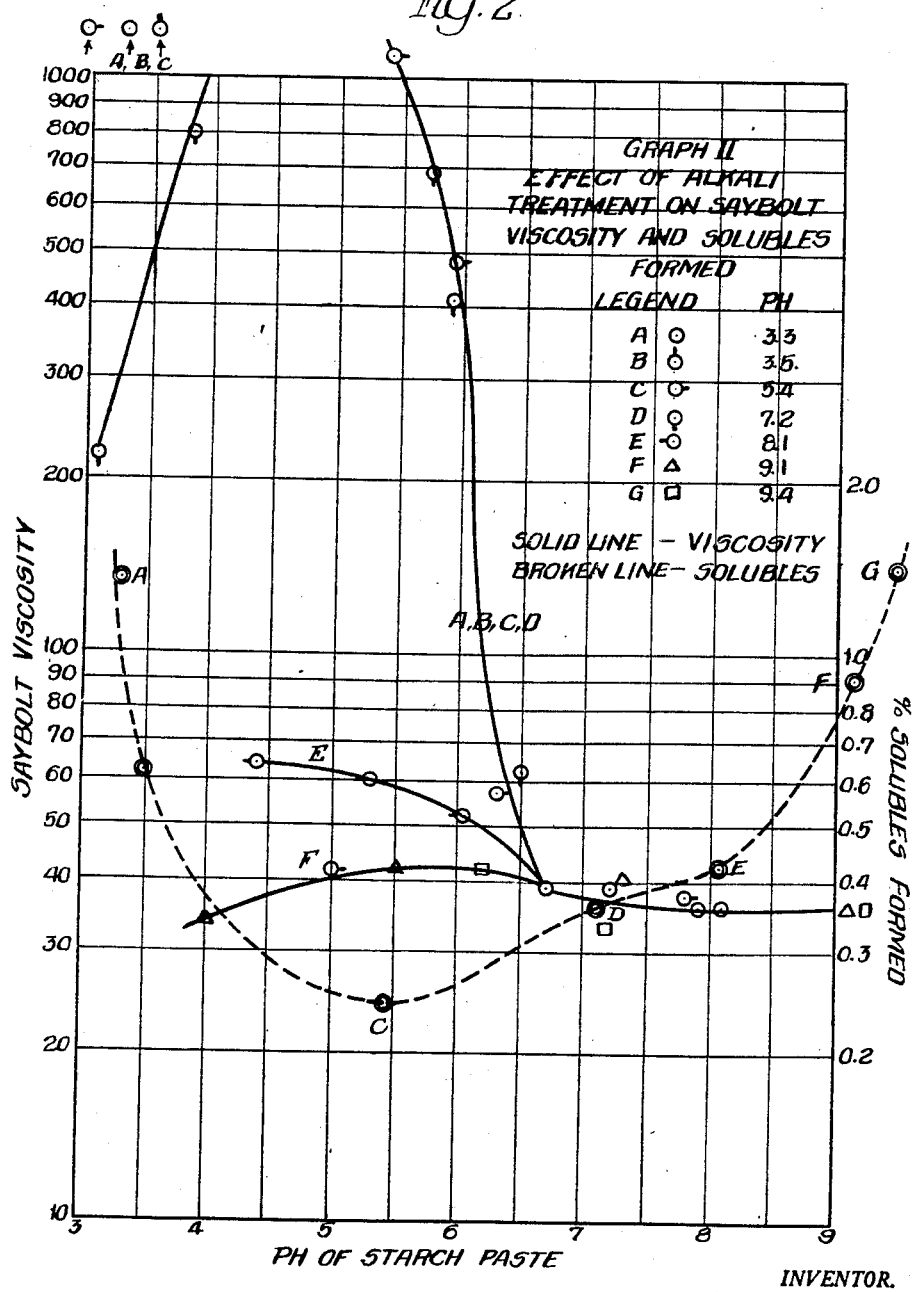

2,432,195

UNITED STATES PATENT OFFICE 2,432,195

STARCH MODIFICATION PROCESS

Donald W. Hansen, Decatur, Ill., assignor to A. E. Staley Manufacturing Company, Decatur, Ill., a corporation of Delaware Application March 9, 1942, Serial No. 433,975

11 Claims. (Cl. 127—33)

This invention relates to the manufacture of starch. More particularly, it pertains to improvements in a thin boiling modification process by the utilization of variable amounts of hexavalent chromium and other controlling factors having correlated improvements and discoveries.

Heretofore it was conventional in manufacturing thin boiling starches to form a suspension of ungelatinized starch in water heated to a temperature somewhat below the swelling temperature of the starch granules in the presence of about 0.5 per cent to 2.0 per cent of a suitable mineral acid. After this treatment had been permitted to continue for the desired length of time, as determined either by established control tests or by experience, the acid in the starch suspension was neutralized with a suitable alkali, for example, sodium carbonate. The starch suspension was then filtered to remove the excess of water and the moist cake which contained about 45 per cent of water was then dried in any suitable manner as practiced in the starch manufacturing industry.

In the course of many modification processes for thin boiling starches it is usually desirable to keep the solubles content at a minimum since the ultimate product may be deleteriously affected because of this degradation characteristic. The solubles present in such starches may be defined as the sum of the solubles formed during the modification process plus the solubles contained in the original starch. The solubles in the original starch usually amount to 0.2 per cent so that if this is deducted from the solubles present in the modified starch the total amount of solubles formed conveniently can be determined.

The fraction of the starch rendered soluble in water by the conventional acid modification method increases with the degree of modification from substantially 0.0 per cent for native starches to about 0.5 per cent at about 85 fluidity. By "fluidity" is meant the so-called "alkali fluidity" determination conventional for use in determining such characteristics in the starch industry and which is more fully discussed hereinafter in connection with viscosity determination. By "native starch" is meant the starch granules isolated from the plant material by the customary method of manufacture and without any further chemical or heat treatment. A native starch, subjected to conventional acid thin boiling methods of starch modification yields progressively less viscous pastes on gelatinization in water by heat as the length of time or the degree of treatment progresses. As the degree of modification is extended to still higher fluidity values the fraction of the starch rendered soluble in water rapidly increases. There are certain disadvantages present in carrying out an acid modification process to a relatively high degree of modification. For example, either an excessively long time of treatment is required or a large amount of acid is necessary to increase the rate of reaction. Particularly is it a disadvantage that a substantial fraction of the starch is rendered soluble in water. This water soluble fraction has long presented a problem difficult of solution. It is either lost in the process waste waters or it involves additional expense for its recovery. Too often it remains in the final starch product and for many applications of the product the presence of a high water soluble fraction is undesirable since it is indicative of an objectionable type of degradation of the starch.

In the numerous ways in which starch is used, such as in paper and textile sizing, in adhesives and in many other forms, its utility becomes dependent on certain of its colloidal properties. It is known that native starch is made up of glucose units in alpha-glucoside linkages in a relatively high degree of polymerization. Through hydrolytic scission, either by acid hydrolysis or by excessive acid thin boiling modification, the starch molecule ultimately can be cleaved to its glucose building units.

In the preparation of a thin boiling starch of, for example, 85 fluidity or higher, the presence of glucose and reducing dextrins can be detected by means of Fehling's solution. The properties of these end products approach those of crystalloids and either have little value or are detrimental in a number of the above mentioned starch applications.

Aqueous colloidal solutions prepared from starch substances whose degree of polymerization falls within the crystalloidal range are characterized by low viscosity, high osmotic pressure and high diffusion velocities as compared to starch substances whose degree of polymerization extends further into the colloidal range.

Self-supporting films, or films on textile or paper fiber surfaces, prepared from a starch solution of a low degree of polymerization do not have the same desirable degrees of mechanical properties of tensile strength, elasticity and ultimate elongation, as those of a somewhat higher degree of polymerization. Since, in a number of its applications, it is essential to have the fluidity of the starch product relatively high, it is desirable to retain the colloidal properties to as large an extent as possible.

Generally, an object of the present invention is the provision of a process which tends to overcome the foregoing as well as many other disadvantages.

A principal object of the present invention is the provision of a process for the manufacture of a thin boiling starch in which the fluidity or viscosity can be predicted substantially independently of the time of reaction by the addition of relatively small predetermined amounts of hexavalent chromium to the usual thin boiling acid modified starch which will result in an increase in the rate of modification as well as a reduction of starch solubles not heretofore attained.

Another object of the invention is to provide a process which will produce an aqueous starch suspension by means of suitable pH control which will result in a thin boiling starch of low viscosity paste when heated for relatively short periods of time as compared with the extended periods of heating times required in conventional methods for providing conventional types of starch.

A further object of the invention is the provision of a process which will produce such a starch in which the degree of modification of the product can be controlled by predetermined amounts of hexavalent chromium to the end that the final viscosity or fluidity of the resulting product can be predicted.

Still another object of the invention is the recovery of a starch product having a very low solubles content and which when pasted will yield a predictable fluidity or viscosity predetermined by the amount of hexavalent chromium utilized in its modification.

Other objects of the invention will in part be obvious and will in part appear hereinafter.

The invention accordingly comprises the several steps and the relation and order of one or more of such steps with respect to each of the others thereof, and the product possessing the features, properties and the relation of elements which are exemplified in the following detailed disclosure and the scope of the application of which will be indicated in the claims.

For a fuller understanding of the nature and objects of the invention reference should be had to the following detailed description taken in connection with the accompanying graphs, in which:

Graph I shows a family of curves illustrating the effect of time of treatment and amounts of $CrO_3$ and $H_2SO_4$ on alkali fluidity, and Graph II similarly illustrates the effect of alkali treatment on Saybolt viscosity and solubles formed.

Generally, the invention contemplates an improvement in the process of manufacturing thin boiling starches and is based on the discovery that the addition of relatively small amounts of hexavalent chromium to the usual acid thin boiling modification of starch brings about an increase in the rate of modification with a resulting decrease in the quantity of solubles formed for any particular degree of modification. I have discovered that chromic acid, chromate salts, dichromate salts and chlorochromate salts are typical examples of hexavalent chromium which will produce the desired results herein described.

The products obtained by this method of modification cover a wide range in properties and it was found desirable to use two methods for determining the viscosity or fluidity of the pastes obtainable. The two methods are widely different in that in one the pastes are prepared by gelatinizing the starch in dilute alkali at room temperature, while in the other the paste is prepared by gelatinizing the starch in hot water.

The first, or "alkali fluidity" method, was found to be particularly suitable for starches of a lower degree of modification, i. e. those having fluidity values of 90 or less. The alkali fluidity method has been described by H. Buel, VIIIth International Congress of Applied Chemistry, Sec. VIa. p. 63 (1912). The method, briefly, consists of preparing by established procedure a paste of 5 grams of the starch in 100 ml. of 0.9 per cent sodium hydroxide. The volume of the efflux of the paste in ml. in the same time required for the efflux of 100 ml. of water from a standardized fluidity funnel is designated as the "fluidity value." By this method native starch has a fluidity value of 2.5 to 3.0 ml. while that of the highly modified or degraded starches will approach that of water, namely 100 ml.

The second, or "Saybolt Universal" method of examining the viscosity of the starch pastes, is a modification of a method of limited established use. The modified procedure is as follows: Ten grams of starch are gelatinized in 150 ml. of water in a 250 ml. beaker heated in a boiling water bath. The heating is continued for 10 minutes after the temperature of the paste has reached 82° C. The paste is then immediately cooled to 52° C., upon which the paste is transferred to a Saybolt viscosimeter equipped with a Universal tip and mounted in a water jacket at 52° C. The time of efflux in seconds of 60 ml. of the paste is reported as the Saybolt Universal viscosity.

The Saybolt method is particularly adaptable to the highly modified starches and can be used for starches as low as 30 or 40 alkali fluidity. There is a further advantage in using the Saybolt method in that viscosities at different pH values can be determined thereby. The relation between the fluidity value and the Saybolt viscosity at a pH of 5.5 is given in Table I.

TABLE I

Relation of fluidity value to Saybolt viscosity

| Fluidity Value | Saybolt Viscosity |
|---|---|
| Ml. | Sec. |
| 0 | 00 |
| 10 | |
| 20 | |
| 30 | 1,500 |
| 40 | 350 |
| 50 | 200 |
| 60 | 116 |
| 70 | 76 |
| 80 | 56 |
| 90 | 45 |
| 95 | 37 |
| [1] 100 | 28.4 |

[1] Water.

It should be noted that by adjustment of the pH of the suspension before the starch is recovered the product differs from what is disclosed in the prior art in that it will yield a low viscosity paste of low solubles content when heated for relatively short periods of time.

It should also be noted that a quantitative relationship exists between the amount of hexavalent chromium used and the degree of modification of the product. It is therefore possible to control and predict the viscosity or fluidity of the product by the amount of hexavalent chromium used.

A preferred procedure for determining the desired characteristics such as viscosity or fluidity of hexavalent chromium on thin boiling starch conversion is set forth in the following typical example:

Typical example 830 parts of a 22.5° Bé. cornstarch suspension containing 380 parts of cornstarch and 450 parts of water were heated to 52° C. To the heated suspension was added 4.48 parts of sulfuric acid in 12.7 parts of water and 2.0 parts of chromium trioxide in 4.5 parts of water. After a time of treatment of 1 hour the acids present were neutralized to a pH of approximately 5.5 by means of sodium carbonate. The starch was recovered by filtering on a suitable filter such as a vacuum type filter, and the moist starch cake was then washed and dried in a suitable tunnel or tray drier. The amount of starch rendered soluble was determined by evaporating an aliquot portion of the filtrate to dryness and then determining the loss on ignition. The loss on ignition is calculated as a percentage of the total dry starch. By subtracting the percentage of organic water solubles in the original starch, which amounts to about 0.2 per cent, there was obtained the percentage of the starch rendered soluble in water by the treatment. The product was found to have an alkali fluidity of 97 and 0.21 per cent of the starch was rendered soluble.

By an extended series of similar actual trials on other starches including tapioca, potato and wheat this process of starch modification was found also to be applicable. In these trials the results of different mineral acids such as, for example, sulfuric and hydrochloric of varying amounts as well as by complete omission thereof were determined. Similarly, these trials were conducted using various amounts of hexavalent chromium (also others omitting such material) and the results determined. These trials were carried out under varying conditions of temperature, the parts of each of these materials being based on the amount of starch used as suspended in varying amounts of water. In this manner was illustrated the effect, for example, of different operating times and amounts of hexavalent chromium on alkali fluidity or Saybolt viscosity and the amount of solubles produced and the effects of varying amounts of sulfuric acid and of time on the alkali fluidity or Saybolt viscosity as well as the solubles produced. This enabled comparisons to be made between hydrochloric and sulfuric acids and their effects on alkali fluidity and Saybolt viscosity measurement as well as a comparison of solubles produced when these different mineral acids were used and also effects of pH of pastes and of conversion times on Saybolt viscosity.

In order to demonstrate the effect of the addition of hexavalent chromium to the conventional thin boiling starch modification process, several examples were carried out in which both the amount of chromium trioxide and the time of treatment were varied. The process for carrying out the various examples is as described in the above typical example.

The effect of the addition of varying amounts of hexavalent chromium is given in Examples I to VI in Table II following and the corresponding curves in Graph I. The effect of time of treatment was determined by removing samples at intervals as shown across the top of Table II. The samples were neutralized and dried according to the procedure as described in the typical example.

The solubles produced in an example similar to the conventional method where hexavalent chromium has been omitted (see Table II) indicate a gradual increase in solubles with time, starting, for example, at about .03 per cent solubles and 20 fluidity after 1 hour treatment to 2.1 per cent solubles at 96 fluidity at the end of 22 hours.

It is to be noted from Examples I to V that by a given length of time of treatment, the addition of increasing amounts of hexavalent chromium causes an increase in alkali fluidity of the product, as well as, on the average, causing a decrease in solubles formed. The effect of increasing amounts of hexavalent chromium on the alkali fluidity is best seen in the accompanying Graph I in which the number of the curve relates to the number of the example in Table No. II. From these data it is seen that 0.1 part of chromium trioxide to 380 parts of starch is substantially the lowest effective limit of concentration.

From curves III, IV and V of Graph I it is shown that the alkali fluidity rapidly rises with increasing time of treatment up to a certain point and then changes relatively slowly. In Example III using 0.5 part of chromium trioxide approximately 4 hours are required to reach this point. In Examples IV and V using 1.0 and 2.0 parts chromium trioxide respectively, approximately 2 and 1 hours time of treatment is required. In Example IV for example, very little advantage would be gained in increase in alkali fluidity by carrying the time of treatment longer than 2 hours. However, an increasingly larger portion of the starch granule would be rendered soluble and it is one of the particularly significant features of this invention that I am able to terminate the time of treatment at such time when the increase in fluidity or decrease in viscosity have substantially reached their limiting value.

From Example VI and curve VI in which the sulphuric acid had been omitted and only chromium trioxide had been added, it is shown that the alkali fluidity rises to a value of 16 and then is not substantially altered on longer time of treatment. This same effect can be brought about by the addition of equivalent amounts of a mineral acid and dichromate or chromate salt.

Examples I to VI are typical of the process as carried out by neutralizing the acids in the starch suspension to a pH value not greater than 7.0 and preferably to 5.5. The starch obtained by this method is characterized by the fact that it will give very viscous gels when gelatinized at a pH value less than about 6.5. The product is useful for such applications in which the starch is to be gelatinized in an alkaline solution. Typical of this is use in adhesives. In many applications it is not desirable to paste in the alkaline condition or to reacidify after pasting in the alkaline condition.

TABLE II

*Tabulation of examples*

380 parts starch—450 parts water (Temp. 52° C.)

| Time Treatment, Hrs. | | | $\frac{a}{\frac{1}{2}}$ | | $\frac{b}{1}$ | | $\frac{c}{2}$ | | $\frac{d}{3}$ | | $\frac{e}{4}$ | | $\frac{f}{5}$ | | $\frac{g}{6}$ | | $\frac{h}{13}$ | | $\frac{i}{22}$ | |
|---|---|---|---|---|---|---|---|---|---|---|---|---|---|---|---|---|---|---|---|---|
| Example No. | Parts $H_2SO_4$ | Parts $CrO_3$ | Flu. | Sol. | Flu. | Sol. | Flu. | Sol. | Flu. | Sol. | Flu. | Sol. | Flu. | Sol. | Flu. | Sol. | Flu. | Sol. | Flu. | Sol. |
| Conventional | 4.48 | | | | 20 | .03 | 32 | .12 | 44 | .14 | 55 | .22 | 63 | .57 | | | | | 96 | 2.10 |
| I | 4.48 | 0.1 | 9½ | .00 | 15 | .01 | 27 | .04 | 42 | .14 | 61 | .26 | | | | | | | | |
| II | 4.48 | 0.2 | 12 | .14 | 23 | .03 | 49 | .10 | 55 | .17 | 68 | .25 | 72 | .32 | 79½ | .33 | | | 95 | 1.67 |
| III | 4.48 | 0.5 | 24½ | .13 | 58 | .14 | 78 | .14 | 86 | .15 | 90 | .21 | 90 | .26 | 91 | .23 | 95 | .80 | 97 | 1.47 |
| IV | 4.48 | 1.0 | 39½ | .22 | 86 | .12 | 95 | .18 | 95 | .21 | 95½ | .17 | 96 | .34 | 97 | .29 | 97 | .65 | 97½ | 1.04 |
| V | 4.48 | 2.0 | 72 | .21 | 97 | .21 | 97½ | .20 | 97½ | .25 | 98 | .20 | 98 | .24 | 98½ | .41 | 98½ | | 98½ | 1.10 |
| VI | | 1.0 | | | 16 | .04 | 17 | .05 | 17 | .08 | | | 18 | .09 | | | | | | |

In the modification of starch at temperatures higher than room temperature and the subsequent recovery of such starch by filtration, the heating and the reaction should be carried out so as not to swell the starch granules. The swollen granules would impair the filterability of the suspension and also cause a mechanical loss of a portion of the product. A suitable method of heating the starch to the desired reaction temperature is to treat the suspension in a tank equipped with a jacket or coils of pipe through which is passed water of a temperature not higher, for example, than about 75° C. This mode of heating prevents the swelling or partial pasting of the granules. Another suitable means of heating the starch is to pass a mixture of steam and compressed air into the suspension.

Another feature of this process is a procedure by which the product can be made to yield fluid pastes in water independent of the pH of the aqueous suspension or paste. It has been found that this can be effected as follows: The ungelatinized starch suspension, after the chromic acid modification step, is rendered alkaline to a pH of 8.0 or greater, immediately acidified to any suitable pH value such as 5.5, for example, and then filtered and dried. The product treated in this way will gelatinize quickly in hot water to give a low viscosity paste.

The effect of the alkali treatment can best be demonstrated by following the changes of viscosity of the pastes by means of the previously described Saybolt viscosity method.

The following Example VII is typical of one in which the subsequent alkali treatment is used.

*Example VII*

830 parts of a 22.5° Bé. cornstarch suspension containing 380 parts of cornstarch and 450 parts of water were heated to 52° C. To the heated suspension is added 4.48 parts of sulfuric acid in 12.7 parts of water and 2.0 parts of chromium trioxide in 4.5 parts of water. After a time of treatment of 1 hour the acids present are neutralized to a pH of approximately 8.5 by means of sodium carbonate and then immediately acidified to any desirable pH as, for example, 5.5. The starch is recovered by filtering on a suitable filter as a vacuum type filter, and the moist starch cake is then dried in a suitable tunnel or tray drier. The amount of starch rendered soluble is determined by evaporating an aliquot portion of the filtrate to dryness and then determining the loss on ignition. The loss on ignition is calculated as a percentage of the total dry starch. By subtracting the percentage of organic water solubles in the original starch, which amounts to about 0.2 per cent, there is obtained the percentage of the starch rendered soluble in water by the treatment.

In order to compare the properties of starch neutralized to various pH values a conversion was carried out with the conditions the same as Example VII. At the end of one hour the batch was divided into 7 parts and varying amounts of sodium carbonate were added so that the pH of the cooked paste varied from 3.3 to 9.4. The percentage of the starch rendered soluble was determined for each sample. The results are given in Table III.

TABLE III

*Example VII*

| Sample | pH | Per cent Solubles |
|---|---|---|
| A | 3.3 | 1.37 |
| B | 3.5 | .606 |
| C | 5.4 | .24 |
| D | 7.2 | .36 |
| E | 8.1 | .42 |
| F | 9.1 | .95 |
| G | 9.4 | 1.45 |

The viscosities of the different samples at various pH values are given graphically in Graph II. It can be seen that the viscosity of all of the samples at pH values greater than 6.7 fell on the same smooth curve. The viscosity of those samples neutralized to a pH of 7.2 or less rose rapidly as the pH was decreased and the values fell on a single curve within the region of pH 5.5 to 6.7. This curve is marked ABCD. The sample D, neutralized to a pH 7.2, showed a decrease in viscosity with an additional decrease in pH. At pH values between 2.8 to 3.5, the viscosity of samples A, B, and C remained well over 1000 seconds.

When the samples were neutralized to a pH value of 8.1 or greater, there was a decrease in viscosity in the acid range with a decrease in pH of treatment. When neutralized to a pH of 9.1 or greater the viscosity varies only from 36 seconds at 8 pH to 42 seconds at 5.5 pH, as is shown by curves F and G. Accordingly, if it is desired to produce a starch which will yield pastes of low viscosity when gelatinized at pH values below 6.7, it is merely necessary to render the conversion mixture alkaline to a pH range of from 8.1 to 9.1 and then acidify back to any suitable pH.

It was also observed that there was a change in amount of solubles formed as the samples are neutralized to varying pH values. These results are shown by the broken line curve in Graph II. It can be seen that as the pH of neutralization is increased from 3.3 to 9.4 the solubles drop from a value of 1.35 to a minimum of .24 per cent at 5.4 pH. The solubles then increase to a value of 1.5 per cent at 9.4 pH.

Between the pH values of 7 and 9 it is possible to obtain a product whose fluidity or viscosity will not be affected by pH. The solubles formed will be closely confined to the vicinity of about 1 per cent and usually below that amount.

With respect to hydrochloric acid compared with sulfuric it was demonstrated that approximately one-half the weight of hydrochloric acid will give the same effect as sulfuric acid. In each case the addition of 0.5 part of chromic acid approximately doubled the rate of conversion. It appears that both in the absence and in the presence of chromic acid, hydrochloric acid will produce around 20 per cent more solubles than will sulfuric acid at any particular alkali fluidity.

From the foregoing demonstrations it was observed that the present invention can be carried out most effectively in an aqueous starch suspension of any suitable concentration (preferably about 380 parts of starch in 450 to 1000 parts of water, i. e. having a Baumé range of 22.5° to 13.5°) within and including at least the following limits: 0.15 to 10.0 parts of chromium trioxide; 0.0 to 9.0 parts of mineral acid (all parts based on weight of starch); temperature ranges between 35° C. to 65° C.; time of treatment, from 10 minutes to 6 hours (or the time at which substantially all of the hexavalent chromium formed is reduced); the product is rendered capable of rapid gelatinization by adjusting the pH of the suspension to between 7.0 and 9.0 pH and then substantially immediately thereafter acidifying to any suitable pH; and, less than about 1 per cent of the starch is rendered soluble. With respect to other varieties of starch not heretofore mentioned, such as cassava, canna, sweet potato, rice, etc. these same limitations may not strictly apply but the effect can be described as being the same but different in magnitude merely.

There are other numerous advantages in addition to those herein described in the production of a low viscosity product by the process of the present invention, such as the comparatively low chemical cost involved (particularly for the very thin boiling starches); the short time of treatment as compared with conventional methods of producing the desired product; a comparatively small and insignificant fraction of the starch is rendered soluble with the consequent improvement of mechanical properties of dried film, and the ease of duplication of viscosities on repeated trials.

It will thus be seen that the objects hereinbefore set forth may be readily and efficiently attained and since certain changes may be made in carrying out the above process, and certain modifications in the article produced thereby may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the manufacture of thin boiling starches, comprising in combination, providing an aqueous starch suspension, adding thereto not more than about 2.4 per cent of mineral acid and 0.04 per cent to 2.5 per cent of hexavalent chromium, said respective percentages being based on the weight of said starch, reacting said suspension at a temperature lying within the range of about 35° to 65° C., continuing said reaction until substantially all of the hexavalent chromium has been reduced, adjusting the pH of said suspension to a value lying within the range of about 8.0 to 9.0 and then substantially immediately thereafter acidifying the same.

2. A process for the manufacture of thin boiling starches, comprising in combination, forming an aqueous starch suspension, adding a mineral acid and 0.04 to 2.5 per cent of hexavalent chromium to form a mixture, said percentages being approximate and based on the weight of said starch, reacting said mixture at a temperature range between about 35° to 65° C., continuing said reaction until substantially all hexavalent chromium has been reduced, and adjusting the pH of said mixture to between about 5.0 to 7.0.

3. A process for the manufacture of thin boiling starches, comprising in combination, forming a mixture of starch with water, a mineral acid and a relatively small predetermined quantity of a hexavalent chromium based on the weight of the starch whereby the viscosity or fluidity of the resulting starch product can be predicted, reacting said mixture at a temperature range between about 35° to 65° C. from about 10 minutes to 6 hours, adjusting the pH of said mixture to between about 7.0 to 9.0, and thereafter acidifying said mixture.

4. A process for the manufacture of thin boiling starches, which comprises forming a mixture of starch with water, a mineral acid and a relatively small predetermined quantity of a hexavalent chromium based on the weight of the starch whereby the viscosity or fluidity of the resulting starch product can be predicted, reacting said mixture at a temperature range between about 35° to 65° C. from about 10 minutes to 6 hours and thereafter adjusting the pH of said mixture to between about 5.0 to about 7.0.

5. A process for the manufacture of thin boiling starches, comprising in combination, forming a mixture of starch with water, a mineral acid, and a relatively small predetermined quantity of a hexavalent chromium based on the weight of the starch whereby the viscosity or fluidity of the resulting starch product can be predicted, reacting said mixture at a temperature range between about 35° to 65° C. until the hexavalent chromium has been reduced, adjusting the pH of said mixture to a suitable alkaline condition to between about 7.0 to 9.0 and thereafter acidifying the same.

6. A process for the manufacture of thin boiling starches, comprising in combination, forming a mixture of starch with water, an acid and a relatively small predetermined quantity of a hexavalent chromium based on the weight of the starch whereby the viscosity or fluidity of the resulting starch product can be predicted, reacting said mixture at a temperature range between about 35° to 65° C. until all the active hexavalent chromium has been reduced and a starch solubles content not greater than around 1.0 per cent has been reached, and neutralizing said mixture to a pH value not greater than 7.0.

7. In the manufacture of thin boiling starches by an acid modification process the improvement which comprises reacting a native starch at a temperature range between about 35° to 65° C. with hexavalent chromium in an amount of about 2.5 per cent based on the weight of the starch until a starch solubles content not greater than around 1.0 per cent has been reached, and neutralizing said mixture to a pH value not greater than 7.0 to obtain a desired fluidity or viscosity.

8. In the manufacture of thin boiling starches by an acid modification process the improvement which comprises reacting a native starch at a temperature range between about 35° to 65° C. with a hexavalent chromium in an amount approximately between the limits of 0.04 to 2.5 per cent based on the weight of the starch until a starch solubles content not greater than around 1 per cent has been reached, and neutralizing said mixture to a pH value not greater than 7.0 to obtain a desired fluidity or viscosity.

9. In the manufacture of thin boiling starches by an acid modification process the improvement which comprises reacting a native starch at a temperature range between about 35° to 65° C. with hexavalent chromium in an amount approximately between the limits of 0.04 to 2.5 per cent based on the weight of the starch and within temperature ranges of 35° to 65° C. until a starch solubles content not greater than 1.0 per cent has been reached, and neutralizing said mixture to a pH value not greater than 7.0 to obtain a desired fluidity or viscosity.

10. In the manufacture of thin boiling starches by an acid modification process the improvement which comprises reacting a native starch at a temperature range between about 35° to 65° C. with hexavalent chromium in an amount not exceeding 2.5 per cent of the starch for a time approximately between the limits of 10 minutes to 6 hours until a product having a low starch solubles content has been reached and neutralizing said mixture to a pH value not greater than 7.0 to obtain a desired fluidity or viscosity.

11. In the manufacture of thin boiling starches by an acid modification process the improvement which comprises reacting a native starch at a temperature range between about 35° to 65° C. with predetermined amounts of hexavalent chromium in an amount approximately 2.5 per cent of the weight of the starch until the active hexavalent chromium is reduced, temporarily neutralizing the reaction mass, and thereafter acidifying said mass to obtain a product with a low solubles content and of predetermined fluidity or viscosity substantially independent of the time of reaction.

DONALD W. HANSEN.

REFERENCES CITED

The following references are of record in the file of this patent:

UNITED STATES PATENTS

| Number | Name | Date |
| --- | --- | --- |
| 2,111,204 | Caesar | Mar. 15, 1938 |
| 2,276,984 | Kauffmann | Mar. 17, 1942 |

FOREIGN PATENTS

| Number | Country | Date |
| --- | --- | --- |
| 544,580 | France | June 26, 1922 |